US011448265B2

(12) United States Patent
Seidel et al.

(10) Patent No.: US 11,448,265 B2
(45) Date of Patent: Sep. 20, 2022

(54) VEHICLE DRIVELINE JOINT INCLUDING A VENT AND SEAL ASSEMBLY

(71) Applicant: Neapco Intellectual Property Holdings, LLC, Farmington Hills, MI (US)

(72) Inventors: Richard L. Seidel, Macomb, MI (US); Michael Hopson, Clinton Township, MI (US); Riki Patel, Royal Oak, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 428 days.

(21) Appl. No.: 16/710,596

(22) Filed: Dec. 11, 2019

(65) Prior Publication Data

US 2020/0182305 A1 Jun. 11, 2020

Related U.S. Application Data

(60) Provisional application No. 62/777,806, filed on Dec. 11, 2018.

(51) Int. Cl.
*F16D 3/84* (2006.01)
*B60K 17/22* (2006.01)
*F16D 3/22* (2006.01)

(52) U.S. Cl.
CPC .............. *F16D 3/843* (2013.01); *B60K 17/22* (2013.01); *F16D 3/22* (2013.01); *F16D 2003/846* (2013.01); *Y10S 277/928* (2013.01); *Y10S 464/906* (2013.01); *Y10T 403/22* (2015.01)

(58) Field of Classification Search
CPC ...... F16D 3/843; F16D 3/22; F16D 2003/846; B60K 17/22; Y10S 277/928; Y10S 464/906; Y10T 403/22
USPC .......................................................... 464/17
See application file for complete search history.

(56) References Cited

U.S. PATENT DOCUMENTS

| 4,319,467 A * | 3/1982 | Hegler ..................... F16D 3/84 |
| | | 277/928 |
| 4,475,737 A * | 10/1984 | Cook, Jr. ................. F16D 3/387 |
| | | 464/17 |
| 9,028,332 B2 | 5/2015 | Ketchel et al. |
| 10,920,832 B2 * | 2/2021 | Oh .......................... F16D 3/845 |

FOREIGN PATENT DOCUMENTS

GB          2 235 749 A  *  3/1991  ...................... 403/31

* cited by examiner

*Primary Examiner* — Greg Binda
(74) *Attorney, Agent, or Firm* — Dickinson Wright PLLC

(57) ABSTRACT

A multi-piece propeller shaft includes a constant velocity joint disposed between and operably interconnecting first and second shaft segments. The constant velocity joint includes an outer race extending along an axis A from a first outer race end operably connected to the second shaft segment to a second outer race end to define an inner surface bounding an internal cavity. A vent and seal assembly is disposed inside the outer race and defines a plurality of venting cavities disposed serially along the axis A in fluid communication with one another. A first one of the venting cavities is disposed in fluid communication with the internal cavity and a last one of the venting cavities is disposed in fluid communication with an environment of the constant velocity joint for venting air from the internal cavity to the environment.

20 Claims, 3 Drawing Sheets

VEHICLE DRIVELINE JOINT INCLUDING A VENT AND SEAL ASSEMBLY

CROSS-REFERENCE TO RELATED APPLICATION

This application claims priority to U.S. Provisional Application Ser. No. 62/777,806 filed Dec. 11, 2018 and entitled a "Vehicle Driveline Joint Having a Venting and Sealing Cavity", the entire disclosure of which is incorporated herein by reference.

BACKGROUND OF THE INVENTION

1. Field of the Invention

The present disclosure relates to vehicle driveline systems. More particularly, the present disclosure relates to constant velocity joints used within a vehicle driveline system and the venting and sealing of these joints.

2. Related Art

This section of the written disclosure provides background information related to vehicle driveline systems and constant velocity joints which is not necessarily prior art to the inventive concepts Vehicle driveline systems are important components in passenger vehicles. Driveline systems operate to transfer torque and power generated by a vehicle engine and transmission to other mechanisms disposed at various locations around the vehicle.

Driveline systems may convert the torque and rotational energy generated by the transmission to a driveshaft of the vehicle. In many cases, the transmission is located near the front of the vehicle, and the driveshaft is connected to the transmission or differential and extends toward a further component to be rotated.

In a front wheel drive vehicle, a pair of driveshafts may extend laterally from the transmission or differential toward the front wheels. In a rear wheel drive vehicle, a single driveshaft may extend rearward from the transmission toward a rear differential, from which additional shafts extend laterally toward the rear wheels.

In many cases, and in particular in front wheel drive vehicles, the driveshafts extending from the transmission or differential will connect to the driven wheels via a constant velocity joint ("CV joint" or "CVJ"). A constant velocity joint includes a mechanism that allows the rotation and torque from the driveshaft to be transferred to an additional rotational component, such as another shaft or flange, that is connected to the wheel, thereby rotating the wheel. The CV joint can transfer this rotation and torque throughout a degree of pivoting by the wheel or attached shaft. Accordingly, the wheels being driven are permitted to rotate about an axis in response to steering commands while also being driven by the rotation of the driveshaft connected to the CV joint. CV joints may also be used at other locations within the vehicle, not just at the wheels. For example, multiple shafts may be connected, in which some pivoting between shafts may be desirable or expected, with the CV joints reducing bending stresses in the shafts while maintaining the torque transfer through the connection.

CV joints typically include a number of internal components that can be susceptible to contamination and debris, which can adversely affect the ability of the components to move relative to each other in response to rotation and pivoting caused by the combined rotation and steering of the wheels. Accordingly, it is desirable to enclose and isolate the internal components of the CV joint from an environment to prevent debris from entering the inside of the CV joint.

However, use of the CV joint includes many components that slide and bear against each other during rotation, which causes an increase in temperature of the components. This increased temperature of the components leads to an increase of temperature and pressure within the CV joint. Accordingly, it is desirable to vent an internal cavity of the CV joint to atmosphere to prevent the CV joint from overheating. However, this venting of the CV joint can also lead to contaminants or other debris accessing the inside of the CV joint.

Additionally, CV joints include lubricants or grease inside the CV joint to improve the performance of the internal components, reducing friction and reducing temperature increases that occur. However, during venting of the CV joint, the grease or lubricant can be expelled on the underbody of the vehicle, which is undesirable because it can falsely alert the user that the CV joint is without lubrication, in addition to the general undesirable effect of a dirty underbody.

In view of the forgoing, there remains a continuing need for improvements to the venting and sealing of CV joints in vehicle driveline systems.

SUMMARY OF THE INVENTION

A vehicle driveline system, such as a multi-piece propeller shaft, includes a constant velocity joint disposed between and operably interconnecting first and second shaft segments. The constant velocity joint includes an outer race extending along an axis A from a first outer race end operably connected to the second shaft segment to a second outer race end to define an inner surface bounding an internal cavity. A vent and seal assembly is disposed inside the outer race and defines a plurality of venting cavities disposed serially along the axis A in fluid communication with one another. A first one of the venting cavities is disposed in fluid communication with the internal cavity and a last one of the venting cavities is disposed in fluid communication with an environment of the constant velocity joint for venting air from the internal cavity to the environment. As will be described in more detail below, in addition to facilitating a venting of the internal cavity, the plurality of venting cavities of the vent and seal assembly also adventurously blocks contaminants from entering the interior cavity of the CV joint while also allowing for grease or lubricant to exit the interior cavity of the CV joint but limiting an amount of the grease or lubricant that exits the CV joint.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Exemplary embodiments will now be described more fully with reference to the accompanying drawings. In particular, non-limiting embodiments of an improved seal and vent assembly for an automotive driveline component, such as a CV joint, is provided so that this disclosure will be thorough and will fully convey the true and intended scope to those who are skilled in the art. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. It should also be appreciated that the present invention can be utilized in connection with other types of automobile components not described fully herein.

Figure 1:
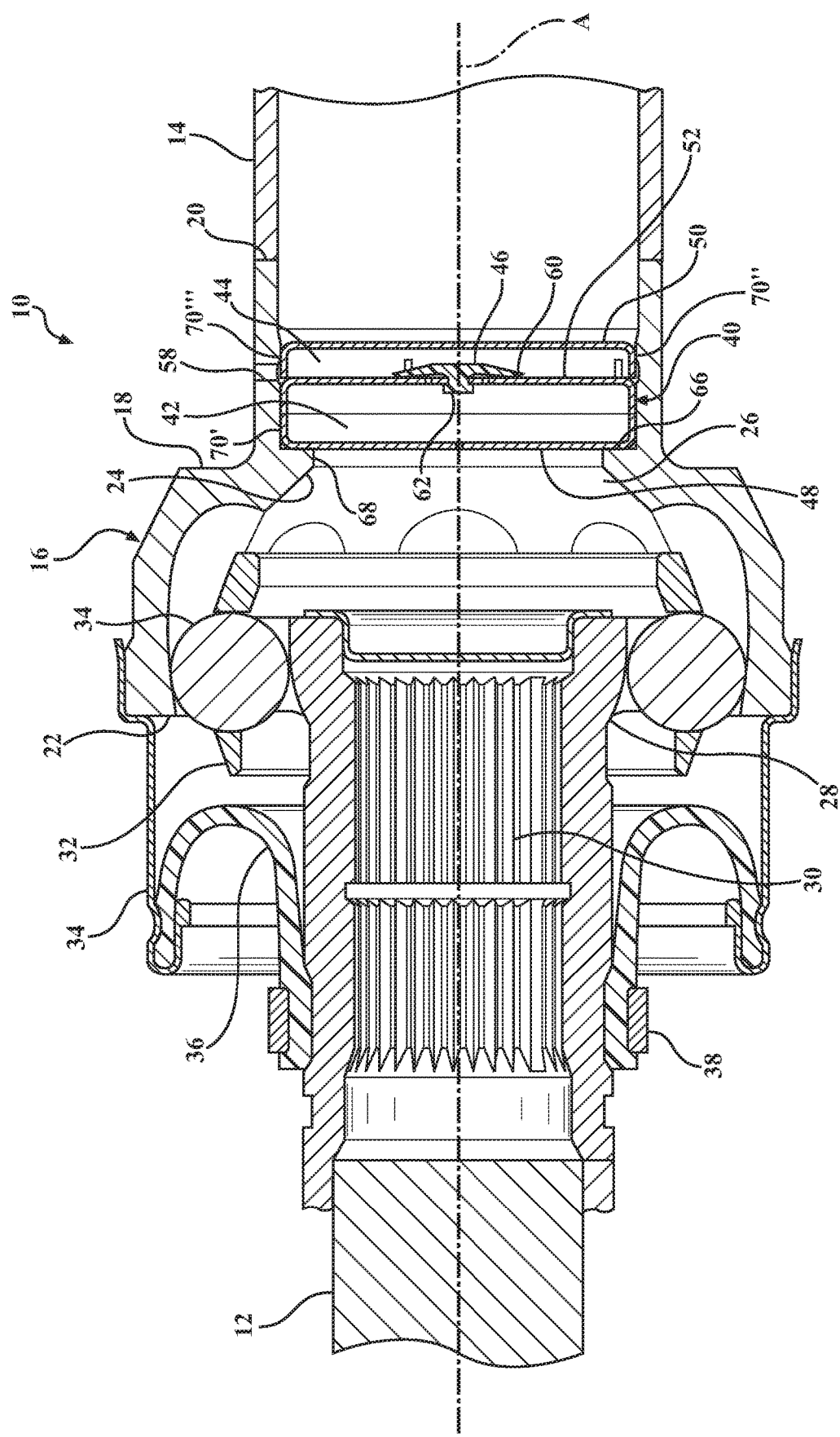
FIG. 1 is a cross-sectional side view of a constant velocity joint operably connecting a first shaft segment and a second shaft segment and including a vent and seal assembly disposed inside an outer race for venting air from an internal cavity to an environment of the constant velocity joint.

As will be explained in more detail below, the seal and vent assembly is preferably employed on a vehicle driveline. For example, the vehicle driveline could be propeller shafts, drive shafts, half shafts, axles, transfer cases, power takeoff ("PTO") units, and/or other components that operate to transmit rotational forces (i.e., rotational energy), between and/or through one or more other automobile driveline components. However, as illustrated in FIG. 1, the vehicle driveline is most preferably a multi-piece propeller shaft 10 that includes a first shaft segment 12 for coupling to a vehicle's transmission (not shown) and a second shaft segment 14 for coupling to a vehicle's differential (not shown). A constant velocity joint 16 (hereinafter "CV joint" or "CVJ") is disposed between and operably interconnects the first shaft segment 12 with the second shaft segment 14 for rotatably supporting the propeller shaft 10 and transferring a rotational force of the first shaft segment 12 to the second shaft segment 14.

As further illustrated in FIG. 1, the CV joint 16 includes an outer race 18 extending along an axis A from a first outer race end 20 operably connected to the second shaft segment 14, such as via friction or laser welding, to a second outer race end 22 to define an inner surface 24 bounding an internal cavity 26 adjacent the second outer race end 22. The CV joint 16 includes an inner race 28 extending along the axis A and operably connected to the first shaft segment 12, such as via a plurality of grooves 30 for mating with a plurality of splines (not expressly shown) disposed on the first shaft segment 12. The CV joint 16 further includes a cage 32 housing a plurality of balls 34 that are disposed between the inner and outer races 18, 28 for rotatably supporting the inner and outer races 18, 28 relative to one another and transmitting torque therebetween.

Figure 2:
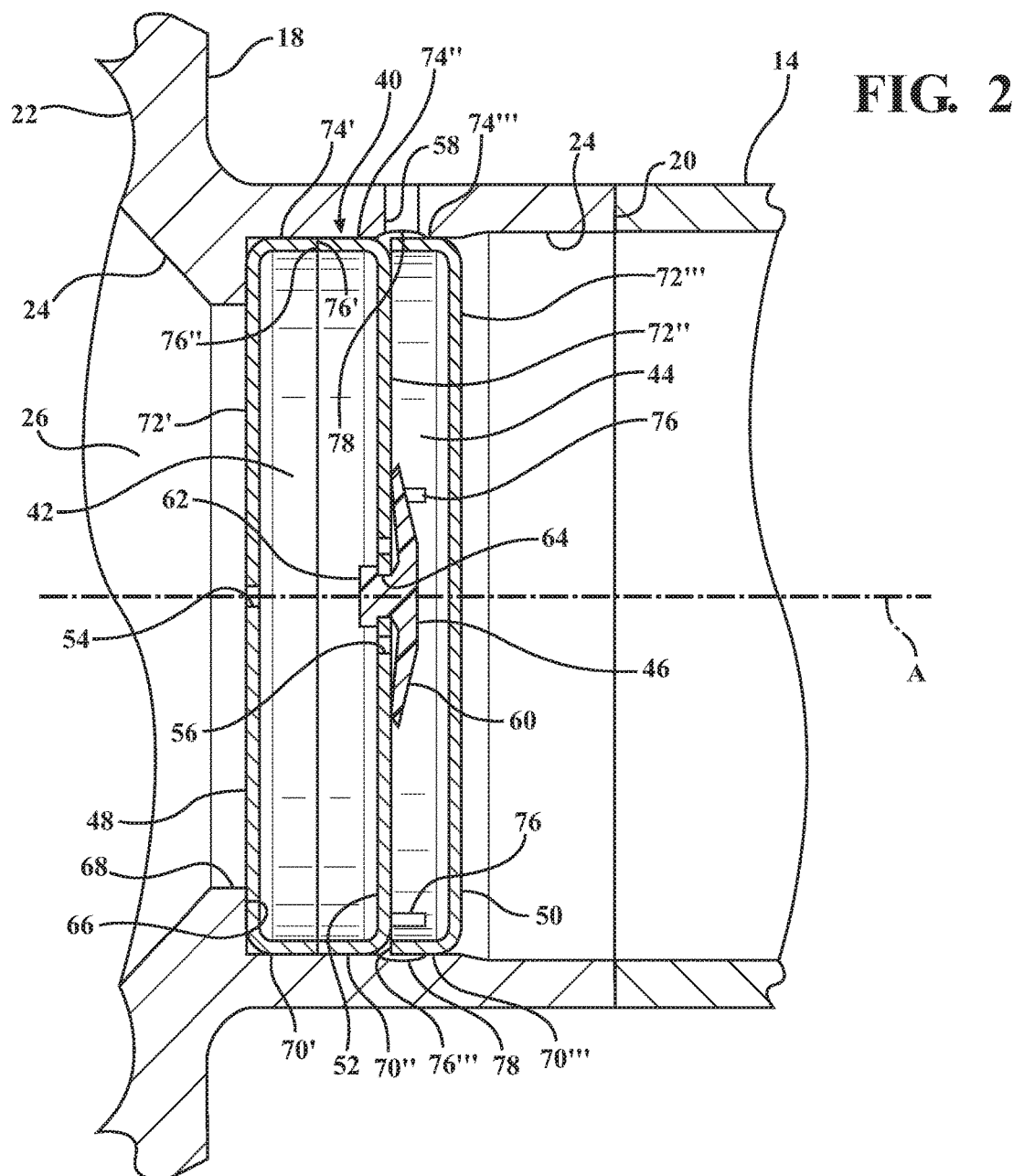
FIG. 2 is a magnified cross-sectional view of a portion of FIG. 1 more clearly illustrating the vent and seal assembly.
Figure 4:
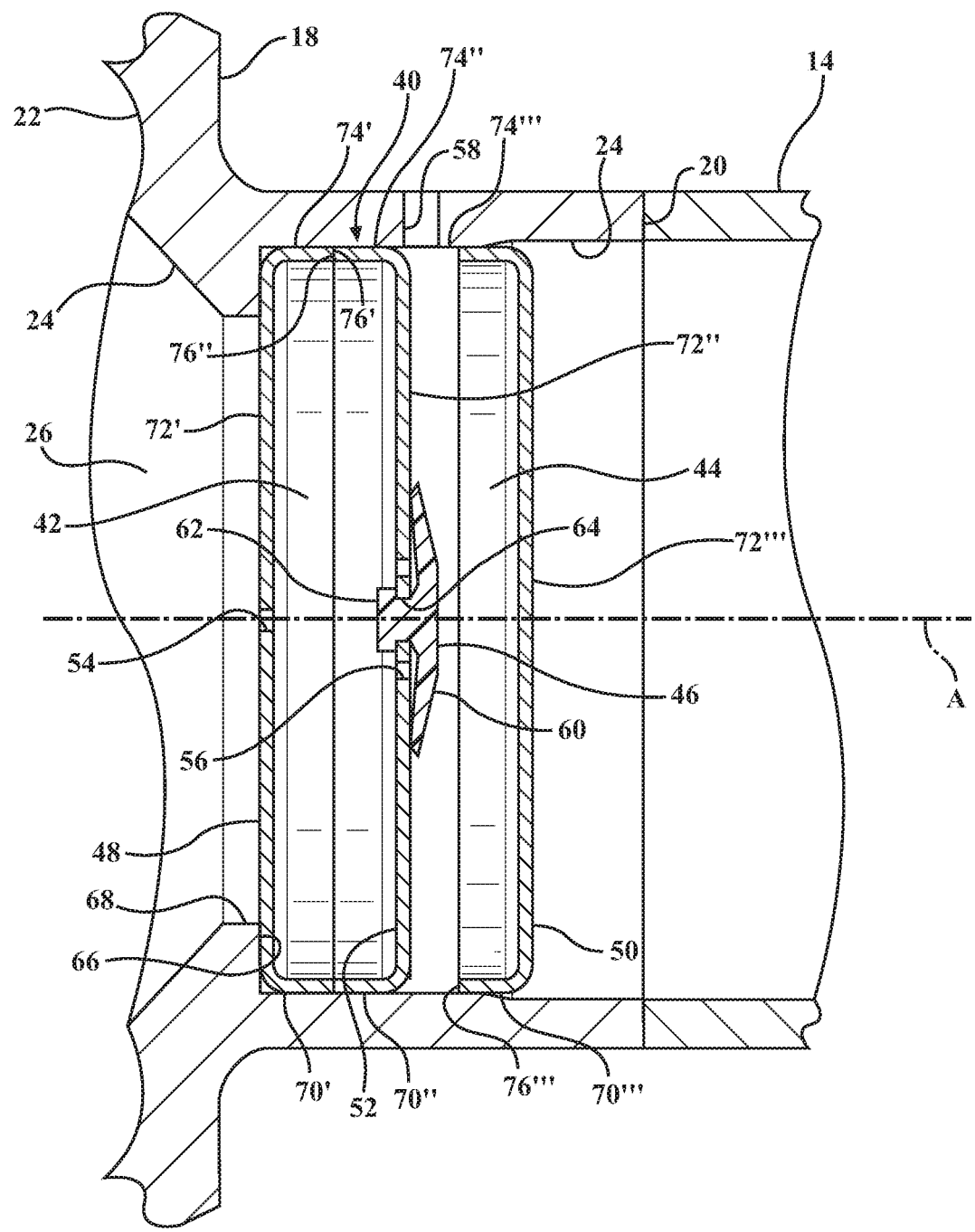
FIG. 4 is a fragmentary cross-sectional view illustrating an alternative arrangement of the vent and seal assembly disposed inside the outer race.

A can 34 is fixed to the outer race 18 adjacent the second outer race end 28, and a boot seal 36 is secured to the can 34 and extends radially from the can 34 into sealing engagement with the inner race 28. More particularly, as illustrated in FIG. 1, the can 34 is crimped about a first end of the boot seal 36 and a clamp 38 is wrapped annually about a second end of the boot seal 36 in order to seal the second outer race end 22 of the outer race 18 with the inner race 28. As best illustrated in FIGS. 1-2 and 4, the CV joint 16 further includes a vent and seal assembly 40 disposed inside the outer race 18 and in abutting relationship with the inner surface 24 adjacent the first outer race end 20 for sealing the internal cavity 26. The vent and seal assembly 40 is securely disposed within the outer race 18, such as via an interference fit, such that lateral movement of the vent and seal assembly 40 relative to the outer race 18 is limited. Together, the can 34, the boot seal 36 and the vent and seal assembly 40 prevent contaminants from entering the internal cavity 26.

As understood in the art, and with reference to FIG. 1, the internal cavity 26 houses the cage 34 as well as the bearing structures of the inner race 28 and the outer race 18. Accordingly, a lubricant or grease is disposed in the internal cavity 26 to reduce friction and heat buildup from these components that bear against each other within the internal cavity 26. The internal cavity 26 also builds up pressure during operation of the CV joint 16. Accordingly, as will be explained in more detail below, the vent and seal assembly 40 does not completely enclose and seal off the internal cavity 26 from an environment of the CV joint 16. Rather, the vent and seal assembly 40 provides a path of fluid communication for the expelling of grease or other lubricant from the internal cavity 26, while also allowing the high pressure air to escape the internal cavity 26. Put another way, the path of fluid communication established by the vent and seal assembly 40 allows the internal cavity 26 to be vented to the environment of the CV joint 16 and thus the pressure inside of the CV joint 16 may be equalized with the atmospheric pressure.

As best illustrated in FIGS. 1-2 and 4, the vent and seal assembly 40 defines a plurality of venting cavities 42, 44 extending serially along the axis A in fluid communication with one another, with a first one 42 of the plurality of venting cavities 42, 44 disposed in fluid communication with the internal cavity 26 and a last one 44 of the plurality of the venting cavities 42, 44 disposed in fluid communication with an environment of the CV joint 16, for venting the high pressure air from the internal cavity 26 of the CV joint 16 to an external environment. This serial arrangement of the venting cavities 42, 44 within the outer race 18 advantageously prevents grease egress from the CV joint 16 as pressure is equalized from internal to atmosphere, while also containing and preventing contamination ingress from entering the CV joint 16. More specifically, a first one 42 of the plurality of venting cavities 42, 44 arranged adjacent and in fluid communication with the internal cavity 26 retains grease egress during normal working conditions and thus allows for grease to exit the interior cavity 26 of the CV joint 16, while the remaining ones 44 of the plurality of venting cavities 42, 44 arranged serially closer to communication with the environment of the CV joint 16 capture and prevent any grease from exiting the CV joint 16. Similarly, the last one 44 of the plurality of venting cavities arranged in fluid communication with the environment of the CV joint 16, and closest to the first outer race end 20, captures and expels external contamination, while the earlier, first one 42 of the plurality of venting cavities 42, 44 isolates the last one 44 of the plurality of venting cavities 42, 44 from the internal cavity 26 and thus prevents the external contamination from reaching the CV joint 16. As best illustrated in FIG. 2, a one-way valve member 46, such as disclosed in U.S. application Ser. No. 16/449,773, now U.S. Pat. No. 11,261,920. Incorporated herein by reference, can be disposed in the path of fluid communication extending between adjacent ones of the plurality of venting cavities 42, 44 to further reduce grease migration from a first one 42 to a last one 44 of the plurality of venting cavities 42, 44 while also preventing external contaminants from ever reaching the first one 42 of the plurality of venting cavities 42, 44. The operation and preferred placement of the one-way valve member 46 will be described in more detail below.

As best illustrated in FIGS. 1 and 2, the vent and seal assembly 40 can have a disc-shaped profile with two axially opposite outer walls, namely a first outer wall 48 disposed adjacent and facing the internal cavity 26 and a second outer wall 50 disposed adjacent the first outer race end 20. The vent and seal assembly 40 includes at least one inner wall 52 disposed axially between the first and second outer walls 48, 50 to define the plurality of venting cavities 42, 44. In other words, each one of the plurality of venting cavities 42, 44 is defined by and disposed between adjacent ones of the first outer wall 48, the second outer wall 50, and the at least one inner wall 52. Each of the first outer wall 48, the second outer wall 50, and the at least one inner wall 52 have a generally cylindrical shape and are arranged generally parallel to one another. However, each of the walls 48, 50, 52 may be arranged at oblique angles relative to one another without departing from the scope of the subject disclosure.

As best illustrated in FIG. 2, the first outer wall 48 of the vent and seal assembly 40 defines at least one inlet hole 54, preferably aligned along the axis A, for establishing fluid communication between the internal cavity 26 and the first one 42 of the plurality of venting cavities 42, 44 disposed adjacent the internal cavity 26. The at least one inlet hole 54 is generally small, but large enough to permit air to sufficiently escape the interior cavity 26 of the CV joint 16 at an acceptable rate of flow. It will be appreciated that the size of the at least one inlet hole 54 will affect the rate of flow, and that various hole sizes could be used to suit the needs of the user. The at least one inlet hole 54, while allowing pressurized air to escape the interior cavity 26 of the CV joint 16, will also allow grease or other lubricant to be expelled along with the air. An increase in the collective size of the at least one inlet hole 54 may increase the amount of grease that escapes through the at least one inlet hole 54. Thus, it is desirable to size the at least one inlet hole 54 such that there is a balance between the rate of air flow and the amount of grease that escapes from the internal cavity 26.

As best illustrated in FIGS. 2 and 4, the at least one inner wall 52 defines at least one inner hole 56 for establishing fluid communication between adjacent ones of the plurality of venting cavities 42, 44 and allowing the pressurized air that has passed into the first one 42 of the plurality of venting cavities 42, 44 to serially pass through subsequent ones of the plurality of venting cavities 42, 44. As further illustrated in FIGS. 2 and 4, the last cavity 44 of the plurality of venting cavities 42, 44 is disposed in fluid communication with the external environment of the CV joint 16 to establish venting of the pressurized air from the internal cavity 26 and through the vent and seal assembly 40. For example, the outer race 18 defines at least one outlet hole 58 disposed adjacent the second outer race end 22 and extending radially through the outer race 18 to the inner surface 24. The last cavity 44 of the plurality of venting cavities 42, 44 is disposed in fluid communication with the at least one outlet hole 58 to vent the pressurized air to the environment of the CV joint 16. In a preferred arrangement, the at least one outlet hole 58 includes three outlet holes 58 disposed in circumferentially spaced relationship around the outer race 18. However, any number of outlet holes 58 can be utilized without departing from the scope of the subject disclosure.

As further illustrated in FIGS. 2 and 4, the vent and seal assembly 40 preferably includes a single, inner wall 52 such that the plurality of venting cavities 42, 44 includes a first venting cavity 42 disposed axially between the first outer wall 48 and the inner wall 52 and a second venting cavity 44 disposed axially between the inner wall 52 and the second outer wall 52. As illustrated in FIG. 2, according to one aspect, the first venting cavity 42 is larger in volume than the second cavity 44. However, as illustrated in FIG. 4, according to another aspect, the second venting cavity 44 can be larger in volume than the first venting cavity 42. The first and second venting cavities 42, 44 can also have substantially the same volume without departing from the scope of the subject disclosure.

As described above, in any arrangement of the venting cavities 42, 44, the first venting cavity 42 is arranged to collect the grease or lubricant that passes or egresses through the inlet hole 54 during a venting of the pressurized air from the internal cavity 26. Initially, the grease may settle along a bottom portion of the first venting cavity 42. However, during rotation of the outer race 18, the grease will also be substantially trapped in the first venting cavity 42 as the grease will be forced radially outward in response to the circumferential forces of rotation.

As described above, the inner wall 52 of the vent and seal assembly 40 includes at least one inner hole 56 for providing fluid communication between the first venting cavity 42 and the second venting cavity 44. The at least one inner hole 56 may be disposed near the radial center of the inner wall 52, and extends axially through the inner wall 52 to establish the path of fluid communication between first and second venting cavities 42, 44. As best illustrated in FIGS. 2 and 4, the at least one inner hole 56 can include a plurality of inner holes 56 arranged circumferentially in aligned and parallel relationship along the axis A and disposed around the radial center of the inner wall 54. For example, if two inner holes 56 are used, the inner holes 56 could be disposed on diametrically opposite sides of the radial center, i.e., the axis A. If three inner holes 56 are used, the inner holes 56 could form a triangle pattern around the radial center, etc. Other spacing of the plurality of inner holes 56 could also be used without departing from the scope of the subject disclosure, namely because this any spacing around the axis A will still allow air to escape through the inner wall 52.

In any arrangement, the at least one inner hole 56 is arranged to allow the pressurized air that has passed into the first venting cavity 42 to pass into the second venting cavity 44. Preferably, grease will be substantially blocked from passing into the second venting cavity 44, namely due to a small size of the inner holes 56 as well as the rotation of the outer race 18. However, to aid in blocking grease from entering the second venting cavity 44, the vent and seal assembly 40 can also include the one-way valve member 46 secured to the inner wall 52. As best illustrated in FIG. 2, the one-way valve member 46 includes a head portion 60 disposed within the second venting cavity 44 and extending over the inner holes 56. The head portion 60 is flexible and biased toward the inner wall 52 to normally block and cover the inner holes 56. The head portion 60 is sized and arranged to be responsive to a predetermined air pressure present in the first venting cavity 42, and in response to exceeding the predetermined air pressure in the first venting cavity 44, the head portion 60 may flex outward to open the one-way valve member 46, allowing air to pass through the inner holes 56 and into second venting cavity 44. Thus, while the one-way valve member 46 is biased closed when air pressure within the first venting cavity 42 is below the predetermined level, grease that reaches the inner holes 56 will also be substantially blocked from entering the second venting cavity 44. As illustrated in FIG. 2, the one-way valve member 46 includes a neck portion 62 that is interference fit into a central, retaining hole 64 defined by the inner wall 52 to locate the one-way valve member 46 at the approximate radial center of the inner wall 52.

As illustrated in FIGS. 1-2 and 4, the outer race 18 includes an annular shoulder 66 extending radially inward from the inner surface 24 to define a central port 68 disposed adjacent the internal cavity 26. The vent and seal assembly 40 is disposed in abutting relationship with the annular shoulder 66 to cover the central port 68 and thus substantially block and seal the grease within the internal cavity 26. Specifically, the first outer wall 48 of the vent and seal assembly 40 is disposed in abutting relationship with the annular shoulder 66 to cover the central port 68 and dispose the first venting cavity 42 into sealed, fluid communication with the internal cavity 26. Accordingly, the annular shoulder 66 provides a mounting surface for the vent and seal assembly 40 within the outer race 18.

As best illustrated in FIGS. 2 and 4, the vent and seal assembly 40 is preferably comprised of a plurality of cup-shaped members 70 assembled within the outer race 18 to seal the internal cavity 26 and define the plurality of venting cavities 42, 44. Each one of the cup-shaped members 70 has a base portion 72 defining a respective one of the walls 48, 50, 52 and a circumferential wall portion 74 extending radially from the base portion 72 to a rim portion 75, with the wall portions 74 each disposed in abutting relationship with the inner surface 24 of the outer race 18 to secure the vent and seal assembly 40 within the outer race 18. In a preferred arrangement, the plurality of cup shaped members 70 includes three cup-shaped members, with a first cup-shaped member 70' defining the first outer wall 48, a second cup-shaped member 70" defining the inner wall 52, and a third cup-shaped member 70''' defining the second outer wall 50. As illustrated in FIGS. 2 and 4, the first and second cup-shaped members 70', 70" are arranged in opposing relationship to one another, with the respective rim portions 75 abutting one another, such that cup-shaped recesses defined by the wall portions 74 face one another and collectively define the first venting cavity 42. Further, the third cup-shaped member 70''' is arranged in the same direction as the second cup-shaped member 70", and thus with the cup-shaped recess defined by the wall portion 74 facing the second cup-shaped member 70". Although the vent and seal assembly 40 is preferably comprised of a plurality of cup-shaped members 70, the vent and seal assembly 40 could also be formed as a single monolithic piece having a unitary homogeneous structure without departing from the scope of the subject disclosure.

As illustrated in FIG. 4, in one arrangement of the plurality of cup-shaped members 70, the third cup-shaped member 70''' is disposed in spaced relationship with the second cup-shaped member 70" and axially past the at least one outlet hole 58 to establish the fluid communication between the second venting cavity 44 and the environment of the CV joint 16. Put another way, in this placement of the third cup-shaped member 70''', the second venting cavity 44 is disposed in direct fluid communication with the at least one outlet hole 58.

Figure 3:
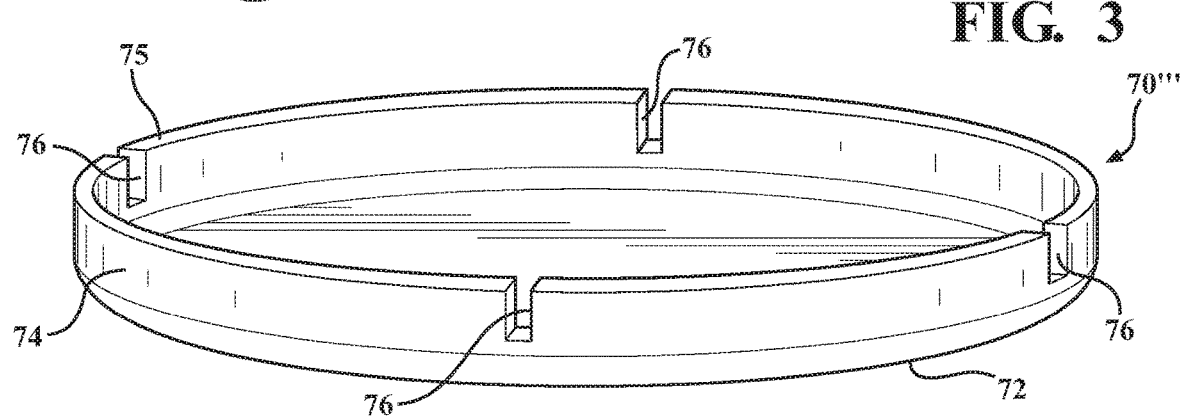
FIG. 3 is a perspective view of a can-shaped member of the vent and seal assembly illustrating a plurality of slots extending from a rim portion towards a base portion.

However, as illustrated in FIG. 2, in another arrangement of the plurality of cup-shaped members 70, the rim portion 75 of the third cup-shaped member 70''' is disposed in abutting relationship with the second cup-shaped member 70" such that the wall portion 74 of the third cup-shaped member 70''' covers the at least one outlet hole 58. Thus, in this arrangement, the circumferential wall portion 74 of the third cup-shaped member 70''' defines at least one slot 76 to establish fluid communication between the second venting cavity 44 and the environment of the CV joint 16. In other words, the at least one slot 76 provides an exit from the second venting cavity 44 to an exterior of the vent and seal assembly 40. As best illustrated in FIG. 3, in a preferred arrangement, the third cup-shaped member 70''' includes a plurality of slots 76 spaced circumferentially and evenly around the wall portion 74 to establish fluid communication between the second venting cavity 44 and the at least one outlet hole 58. The plurality of slots 76 can each extend from the rim portion 75 of the wall portion 74 towards, but stopping short of, the base portion 72.

As best illustrated in FIG. 2, when the wall portion 74 of the third cup-shaped member 70' covers the at least one outlet hole 58, the inner surface 24 of the outer race 18 can define a circumferential groove 78 disposed adjacent, and thus at a terminating end, of the at least one outlet hole 58. The circumferential groove 78 preferably extends around the entire circumference of the inner surface 24 and is disposed adjacent and in aligned relationship with the slots 76 defined by the third can-shaped member 70'. In other words, the slots 76 will open into space defined by the circumferential groove 78 when the vent and seal assembly 40 is installed in the outer race 18. Accordingly, the circumferential groove 78 assists in the venting of air from the second venting cavity 44 to the environment of the CV joint 16 when the vent and seal assembly 40 is arranged in overlaying or covering relationship with the at least one outlet hole 58. In addition, external contamination ingress is further reduced because as the contamination enters the outlet hole 58, the contamination must additionally travel through the circumferential groove 78 before reaching the slots 76 and thus passing into the second venting cavity 44. Accordingly, the circumferential groove 78 provides the additional function of trapping or blocking contamination ingress. Also, even if contaminants do reach the second venting cavity 44, venting air may force and expel the contaminants during venting. Although the circumferential groove 78 is illustrated on the inner surface 24 of the outer race 18, the circumferential groove 78 could alternatively be provided along the wall portion 74 of the third can-shaped member 70''' in aligned relationship with the slots 76.

In view of the aforementioned disclosure, it should be appreciated that venting air passing through the inlet hole 54 from the internal cavity 26 into the first venting cavity 42, and then passing through the at least one inner hole 56 into the second venting cavity 44, and then passing through the slots 76 into the circumferential groove 78, will ultimately pass through the groove 78 and out through the outlet hole(s) 58 to vent into the atmosphere or the environment of the CV joint 16. This path of fluid communication is created when pressure within the first venting cavity 42 is elevated beyond a threshold level such that the one-way valve member 46 will open. When pressure drops within the first venting cavity 42 after venting, the one-way valve member 46 will close and block the path of fluid communication between the first and second venting cavities 42, 44.

Moreover, the one-way valve member 46 blocks the at least one inner hole 56 after venting has completed. Thus, contaminants that enter the second venting cavity 44 when venting is not occurring will be blocked by the one-way valve member 46, and therefore will be blocked from entering the first venting cavity 42. Furthermore, even if some small amount of contaminant were to nevertheless enter the first venting cavity 42 through the at least one inner hole 56, the contaminants would still have to reach the radially, centrally located, inlet hole 54 to reach the interior cavity 26 of the CV joint 16. However, due to the rotational movement of the outer race 18 during operation of the CV joint 16, it is difficult for contaminants to ultimately reach and pass through the inlet hole 54.

Thus, the above described vent and seal assembly 40 provides a robust solution that allows for venting of pressurized air from the interior cavity 26 of the CV joint 16, while also advantageously limiting egress of grease and ingress of contaminants.

Having described the structure of the vent and seal assembly 40, the operation of a multi-piece propeller shaft 10 including a CV joint 16 having a preferred arrangement of the vent and seal assembly 40 will now be described in additional detail.

During operation of the multi-piece propeller shaft 10, the CV joint 16 allows for rotation of the first shaft segment 12 to be transferred to the second shaft segment 14. More particularly, the first shaft segment 12 is driven by a transmission or the like, causing the first shaft segment 12, and thus components of the CV joint 16, to rotate. More specifically, rotation of the first shaft segment imparts rotational forces on the outer race 18, the inner race 28, the cage 32, and the plurality of balls 34. The rotation of these CV joint components increases a temperature within the CV joint 16, and in response thereto, the pressure within the CV joint 16 will also increase.

In response to the increased pressure, air within the internal cavity 26 of the CV joint 16 will vent into the vent and seal assembly 40 through the inlet hole 54 and into the first venting cavity 42. The pressure within the first venting cavity 42 increases as the higher pressure air enters the first venting cavity 42 and will continue to increase within the first venting cavity 42 as the pressure within the CV joint 16 increases, the pressure which acts on the one-way valve member 46 via the inner holes 56 in the inner wall 52, but the one-way valve member 46 remains closed while the pressure is below the predetermined threshold level.

In response to the pressure within the first venting cavity 42 reaching the threshold level, the pressure within the first venting cavity 42 opens the one-way valve member 46. In response to opening the one-way valve member 46, the high pressure air will vent into the second venting cavity 44 through the inner holes 56. The one-way valve member 46 remains open while the pressure remains above the threshold level, and high pressure air will continue to vent into the second venting cavity 44.

In response to the high pressure air entering the second venting cavity 42, the air will exit the vent and seal assembly 40 via the slots 76, and will enter the circumferential groove 78. In response to entering the circumferential groove 78, the air will travel around the groove 78 and exit the outer race 18 via the outlet hole 58.

As the high pressure air exits the vent and seal assembly 40, the pressure in the first and second venting cavities 42, 44, and within the CV joint 16, will drop. In response to the pressure dropping, the pressure will fall below the threshold level, and the one-way valve member 46 will close, thereby blocking the inner holes 56 and fluidly isolating the first venting cavity 42 from the second venting cavity 44. Air in the second venting cavity 44 may still vent outside of the vent and seal assembly 40 through the outlet hole 58 of the outer race 18. The one-way valve member 46 may remain closed until the pressure in the CV joint 16 and the first venting cavity 42 again reaches and exceeds the threshold level.

The above process may be repeated as necessary during the life of the CV joint 16. While the above description has been in reference to the CV joint 16, it will be appreciated that the disclosed vent and seal assembly 40 may also be effective in venting the interior of other joint types where an interior of the joint is substantially closed off from the environment and may be subject to pressure increase during use.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A multi-piece propeller shaft comprising:
   a first shaft segment and a second shaft segment;
   a constant velocity joint disposed between and operably interconnecting said first and second shaft segments;
   said constant velocity joint including an outer race extending along an axis A from a first outer race end operably connected to said second shaft segment to a second outer race end to define an inner surface bounding an internal cavity;
   a vent and seal assembly disposed inside said outer race in abutting relationship with said inner surface;
   said vent and seal assembly defining a plurality of venting cavities disposed serially along said axis A in fluid communication with one another, with a first one of said plurality of venting cavities disposed in fluid communication with said internal cavity and a last one of said plurality of venting cavities disposed in fluid communication with an environment of said constant velocity joint for venting air from said internal cavity to said environment; and
   a one-way valve member disposed in the path of fluid communication between said plurality of venting cavities.

2. The multi-piece propeller shaft as set forth in claim 1, further comprising:
   said vent and seal assembly including a first outer wall disposed adjacent and facing said internal cavity, a second outer wall disposed axially opposite said first outer wall adjacent said first outer race end, and at least one inner wall disposed axially between said first and second outer walls; and
   wherein each one of said plurality of venting cavities is defined by and disposed between adjacent ones of said first outer wall, said second outer wall, and said at least one inner wall.

3. The multi-piece propeller shaft as set forth in claim 2, wherein said first outer wall defines at least one inlet hole for establishing fluid communication between said internal cavity and said first one of said plurality of venting cavities.

4. The multi-piece propeller shaft as set forth in claim 3, wherein said at least one inner wall defines at least one inner hole for establishing fluid communication between adjacent ones of said plurality of venting cavities and allowing the air vented from said internal cavity into said first one of said plurality of venting cavities to serially pass to said last one of said plurality of venting cavities.

5. The multi-piece propeller shaft as set forth in claim 4, wherein said outer race defines at least one outlet hole disposed adjacent said first outer race end and extending radially through said outer race from said environment of said constant velocity joint to said inner surface, and said last cavity of said plurality of venting cavities is disposed in fluid communication with said at least one outlet hole to vent air to said environment.

6. The multi-piece propeller shaft as set forth in claim 5, wherein said one-way valve member is secured in said at least one inner wall and includes a head portion covering said at least one inner hole and being flexible and biased towards said first one of said plurality of venting cavities to normally block said at least one inner hole.

7. The multi-piece propeller shaft as set forth in claim 5, further comprising:
   said outer race defining an annular shoulder extending radially inward from said inner surface adjacent said internal cavity; and
   said first outer wall of said vent and seal assembly disposed in abutting relationship with said annular shoulder to dispose said first one of said plurality of venting cavities into sealed fluid communication with said internal cavity.

8. The multi-piece propeller shaft as set forth in claim 5, wherein said plurality of venting cavities is comprised of a pair of venting cavities and said at least one inner wall is comprised of a single, inner wall to define a first venting cavity disposed between said first outer wall and said inner wall and a second venting cavity disposed between said inner wall and said second outer wall.

9. The multi-piece propeller shaft as set forth in claim 8, wherein said vent and seal assembly is comprised of a plurality of cup-shaped members assembled within said outer race to define said first and second venting cavities, with each of said plurality of cup-shaped members having a base portion defining a respective one of said first outer wall, said second outer wall, or said inner wall, and a wall portion extending radially from said base portion to terminate at a rim portion.

10. The multi-piece propeller shaft as set forth in claim 9, wherein said plurality of cup-shaped members includes a first and second cup shaped member arranged in opposing relationship to dispose said respective rim portions in abutting relationship with one another for defining said first cavity and a third cup-shaped member arranged with said wall portion extending axially towards said second cup-shaped member to define said second cavity.

11. The multi-piece propeller shaft as set forth in claim 10, wherein said rim portion of said third cup-shaped member is disposed in spaced relationship with said second cup-shaped member to dispose said second venting cavity in direct fluid communication with said at least one outlet.

12. The multi-piece propeller shaft as set forth in claim 10, wherein said rim portion of said third cup-shaped member is disposed in abutting relationship with said second cup-shaped member to cover said at least one outlet of said outer race with said wall portion of said third cup-shaped member, and said wall portion of said third cup-shaped member defining at least one slot for establishing fluid communication between said second venting cavity and said at least one outlet.

13. The multi-piece propeller shaft as set forth in claim 12, wherein said at least one slot includes a plurality of slots disposed in circumferentially spaced relationship around said wall portion of said third cup-shaped member and each extending from said rim portion towards said base portion.

14. The multi-piece propeller shaft as set forth in claim 12, wherein said inner surface of said outer race defines a circumferential groove disposed adjacent said at least one outlet hole and in radially aligned relationship with said at least one slot for assisting in the venting of air from said second venting cavity to said environment of said CV joint.

15. A constant velocity joint comprising:
   an outer race extending along an axis A from a first outer race end to a second outer race end to define an inner surface bounding an internal cavity;
   a vent and seal assembly disposed inside said outer race in abutting relationship with said inner surface;
   said vent and seal assembly defining a plurality of venting cavities disposed serially along said axis A in fluid communication with one another, with a first one of said plurality of venting cavities disposed in fluid communication with said internal cavity and a last one of said plurality of venting cavities disposed in fluid communication with an environment of the constant velocity joint for venting air from said internal cavity to said environment; and
   a one-way valve member disposed in the path of fluid communication between said plurality of venting cavities.

16. The constant velocity joint as set forth in claim 15, further comprising:
   said vent and seal assembly including a first outer wall disposed adjacent and facing said internal cavity, a second outer wall disposed axially opposite said first outer wall adjacent said first outer race end, and at least one inner wall disposed axially between said first and second outer walls; and
   each one of said plurality of venting cavities being defined by and disposed between adjacent ones of said first outer wall, said second outer wall, and said at least one inner wall.

17. The constant velocity joint as set forth in claim 16, wherein said first outer wall defines at least one inlet hole for establishing fluid communication between said internal cavity and said first one of said plurality of venting cavities, and said at least one inner wall defines at least one inner hole for establishing fluid communication between adjacent ones of said plurality of venting cavities to allow the air vented from said internal cavity into said first one of said plurality of venting cavities to serially pass to said last one of said plurality of venting cavities.

18. The constant velocity joint as set forth in claim 17, wherein said outer race defines at least one outlet hole disposed adjacent said first outer race end and extending radially through said outer race from said environment of the constant velocity joint to said inner surface, and said last cavity of said plurality of venting cavities disposed in fluid communication with said at least one outlet hole to vent air to said environment.

19. The constant velocity joint as set forth in claim 18, wherein said one-way valve member is secured in said at least one inner wall and includes a head portion covering said at least one inner hole and being flexible and biased towards said first one of said plurality of venting cavities to normally block said at least one inner hole.

20. The constant velocity joint as set forth in claim 18, wherein said inner surface of said outer race defines a circumferential groove disposed adjacent said at least one outlet hole and in radially aligned relationship with said second venting cavity for assisting in the venting of air from said second venting cavity to said environment of the CV joint.

\* \* \* \* \*